United States Patent Office 3,614,872
Patented Oct. 26, 1971

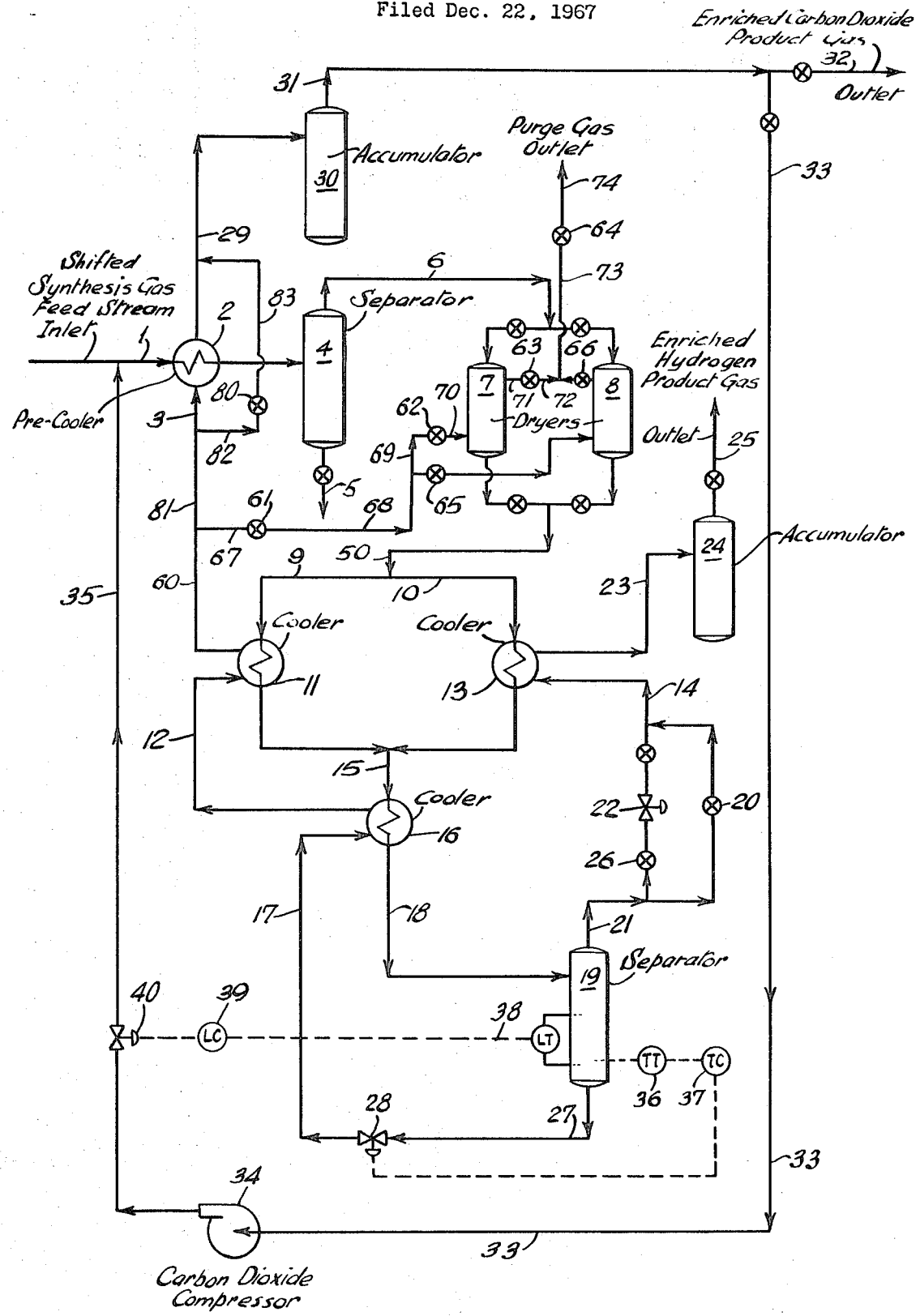

3,614,872
SYNTHESIS GAS SEPARATION PROCESS
Joseph P. Tassoney, Whittier, and Warren G. Schlinger, Pasadena, Calif., assignors to Texaco Inc., New York, N.Y.
Filed Dec. 22, 1967, Ser. No. 692,864
Int. Cl. F25j 1/00, 3/00, 3/06
U.S. Cl. 62—26
12 Claims

ABSTRACT OF THE DISCLOSURE

Superatmospheric autorefrigeration process for separating a gaseous mixture comprising essentially hydrogen and carbon dioxide into an enriched hydrogen product stream and an enriched carbon dioxide product stream.

The gaseous feedstream at a pressure of about 40 to 250 atmospheres is cooled so that 30 to 95% of the carbon dioxide is condensed by noncontact counterflow heat exchange with refrigerants, and liquid carbon dioxide is then separated from the uncondensed gases. The two departing product streams are separately employed as refrigerants to cool said fractions of the feedstream. The temperature of the enriched carbon dioxide product stream and when desired, such as at start-up, the temperature of the enriched hydrogen product stream is further reduced by expansion to about the triple point of carbon dioxide (and even lower for the enriched hydrogen stream) without solid formation. A portion of the enriched carbon dioxide product stream is recycled to the inlet of the process and combined with the feedstream to improve the separation efficiency of the system. The enriched hydrogen product stream may be used directly as feedstock for chemical synthesis or may be further processed to make pure hydrogen.

BACKGROUND OF THE INVENTION

Field of the invention

This invention relates to an autorefrigeration process for separating a mixture of gases into an enriched low boiling stream and an enriched higher boiling stream. In one of its more specific aspects it relates to a superatmospheric autorefrigeration process whereby a gaseous mixture comprising essentially carbon dioxide and hydrogen is cooled to such low temperatures that a substantial amount of the carbon dioxide is selectively condensed and separated.

Description of the prior art

In current methods for making hydrogen, a gaseous stream of hydrogen and carbon monoxide (referred to as synthesis gas) is first produced by known processes, such as by the partial oxidation of a hydrocarbonaceous fuel or by steam-hydrocarbon reforming. Then by the well known water-gas shift conversion reaction, the carbon monoxide in such gaseous streams is reacted with steam over a catalyst. The resulting gaseous mixture comprises essentially carbon dioxide and hydrogen and may contain minor amounts of water vapor, gaseous hydrocarbons, carbon monoxide, and hydrogen sulfide. Finally, the enriched hydrogen product stream is obtained from this gaseous mixture by removing or reducing the amount of carbon dioxide and other impurities using standard methods of chemical treatment or solvent absorption.

Typical chemical schemes for reducing the quantity of carbon dioxide in gaseous mixtures include absorption of carbon dioxide in aqueous mono or diethanolamine followed by caustic treatment, and also hot potassium carbonate or water scrubbing followed by treating with aqueous monoethanolamine. However, gaseous impurities such as COS, $CS_2$ and $H_2S$, as commonly found in synthesis gas may form nonregenerable compounds with such solvents that do not absorb carbon dioxide.

In current processes wherein carbon dioxide is condensed from a stream of mixed gases by cooling, ice and solid carbon dioxide particles deposit on surfaces and reduce their effectiveness for heat transfer. Furthermore, these solids clog passageways and restrict the flow of fluid therein. Also any moving parts, such as valves, may be rendered inoperative. Furthermore, they are also limited with respect to the amount of carbon dioxide that can be separated from the feedstream as they do not operate above 57 atmospheres.

SUMMARY OF THE INVENTION

By the process of our invention, gaseous mixtures comprising essentially hydrogen and carbon dioxide are separated into an enriched hydrogen product stream and an enriched carbon dioxide product stream. The major portion of the undesirable hydrogen sulfide in the feedstream will separate out along with the later product stream.

The gaseous feedstream may be supplied to the system already dried by a suitable conventional drying process. Or the feedstream may be dried by the following procedure at essentially no drop in line pressure. A moist feedstream at a line pressure of about 40 to 250 atmospheres may be dried by being cooled in a first cooling zone to a temperature below the dew point of water by noncontact counter flow heat exchange with a refrigerant to be further described. In a first separating zone, the condensed water is separated from the feedstream. Next, the feedstream is substantially dehydrated by contact with a desiccant such as alumina.

The dried feedstream is then divided into two fractions, in accordance with that ratio which offers maximum heat exchange. After being separately cooled in second and third cooling zones by noncontact counterflow heat exchange with separate refrigerants, the fractions are recombined.

The cooled feedstream is then chilled to a temperature of about —55 to —65° F. (below the dew point of carbon dioxide) in a fourth cooling zone by noncontact counterflow heat exchange with a refrigerant. Depending upon the pressure, about 30 to 95% of the $CO_2$ in the feed gas is condensed along with about 4% of the $H_2$, 90% of the $H_2S$ and minor amounts of CO, $CH_4$, $N_2$ and A. In a second separating zone, an enriched carbon dioxide liquid phase is separated from the enriched hydrogen gaseous phase—the two phases constituting product streams. As the triple point temperature of carbon dioxide is approached in the separating zone, the quantity of carbon dioxide condensed increases, whereas the amount of hydrogen dissolved in the liquid carbon dioxide remains substantially unchanged.

The temperature of the liquefied enriched carbon dioxide product stream is then reduced to a temperature of about —65 to —69° F. (above the triple point of carbon dioxide) by adiabatic isenthalpic expansion through a first throttle valve without forming solids. This chilled product stream is then directed serially through said fourth, second, and first cooling zones as the aforementioned refrigerant in noncontact counterflow heat exchange with the downflowing feedstream.

Similarly, where more refrigeration is required such as during start-up, the temperature of the uncondensed enriched hydrogen product stream may be reduced to about —65 to —100° F. without forming solids in the system by adiabatic isenthalpic expansion through a second throttle valve. This chilled gaseous hydrogen stream is then directed through said third cooling zone as the aforementioned refrigerant in noncontact counterflow heat exchange with a portion of the feedstream.

Provision has been made for recompressing and recycling a portion of the enriched carbon dioxide product stream to the feedstream inlet. This recycled stream of gas is mixed with the feed to improve the separation efficiency of the system. Furthermore, by adiabatic isentropic expansion, a portion of the enriched carbon dioxide product stream may be reduced to a temperature of about $-110°$ F. and about atmospheric pressure without forming solids to supply additional refrigeration for cooling and partially condensing the downflowing feed gas stream.

Without departing from the scope of the invention, in specific cases as determined by material and heat balances, the functions of the various cooling zones may be combined in one or more cooling zones; or if expedient, an additional cooling zone may be added to the system.

It is, therefore, a principal object of the present invention to provide an improved autorefrigeration process for separating large quantities of shifted synthesis gas or similar gaseous mixtures into two fractions—a liquefied enriched carbon dioxide fraction and a gaseous enriched hydrogen fraction.

A still further object of this invention is to provide an efficient autorefrigeration process for separating a high pressure feedstream of shifted synthesis gas, said process operating at substantially the same pressure as that of the feedstream.

Another object of this invention is to provide a process for dehydrating a stream of shifted synthesis gas at superatmospheric pressure and condensing out 30 to 95% of the carbon dioxide and hydrogen sulfide without employing external refrigeration.

A further object of this invention is to provide a system for removing carbon dioxide from a stream of shifted synthesis gas employing temperatures below the triple point of carbon dioxide without forming solids.

Still another object of this invention is to provide a process for separating a gaseous mixture comprising essentially hydrogen and carbon dioxide at superatmospheric pressure by utilizing each separated product stream as a refrigerant to condense out carbon dioxide from the feedstream, and which process provides for recycling a portion of the separated carbon dioxide to the feed inlet to improve separation efficiency.

DESCRIPTION OF THE INVENTION

The preferred embodiment of this invention is diagrammatically illustrated in the accompanying drawing with reference to the separation of $CO_2$, $H_2S$, and $H_2O$ from water saturated shifted synthesis gas; but it is to be understood that this invention is equally applicable to the separation and recovery of other gases capable of selective liquefaction within the ranges of temperature and pressure prevailing in the system.

In the drawing, at inlet 1 a moist feedstream at a line pressure of about 1400 p.s.i.g. is conducted to precooler 2 where it is cooled to a temperature below the dew point of the water vapor in the gas (about 45 to 65° F.) by noncontact counterflow heat exchange with enriched carbon dioxide product stream 3. Precooler 2 condenses out most of the water in the feed gas. This water builds up in separator 4 and is expelled from the system through line 5. From the top of separator 4 the partially dried feed gas is conducted through line 6 to either dryer 7 or 8 where the remaining water vapor in the gas is removed by contact with a suitable chemical absorbent such as alumina or silica gel. The parallel flow arrangement of duplicate dryers 7 and 8 permits the regeneration of one dryer while the other dryer is on-stream. This scheme will be described more fully later. If the feed gas is supplied to the system already dried by some conventional process, then this portion of the system may be eliminated.

Dried feed gas, at substantially initial line pressure, enters the separating portion of the system through line 50. It is then divided into first fraction 9 and second fraction 10. First fraction 9 is conducted to cooler 11 where it is cooled to a temperature of about $-5$ to $-20°$ F. by noncontact counterflow heat exchange with enriched carbon dioxide product stream 12. Second fraction 10 is conducted to cooler 13 where it is cooled to a temperature of about 0 to $-10°$ F. by noncontact counterflow heat exchange with enriched hydrogen product stream 14. First and second fractions 9 and 10 are recombined in line 15 and introduced into cooler 16 where the gas stream is then reduced to a temperature below the dew point of carbon dioxide (about $-55$ to $-65°$ F.) but above the triple point of carbon dioxide (about $-69.9°$ F.) by noncontact counterflow heat exchange with enriched carbon dioxide stream 17. Coolers 11, 13, and 16 condense out from about 30 to 95 mole percent of the carbon dioxide and hydrogen sulfide in the feedstream along with about 8 to 35 mole percent of the other gaseous components in the feedstream.

The enriched carbon dioxide liquid stream flows through line 18 into separator 19 along with the uncondensed portion of the feed gas that comprises about 80 to 95 mole percent of the hydrogen in the feedstream plus about 65 to 85 mole percent of argon, carbon monoxide, nitrogen, and about 10 to 35 mole percent of the carbon dioxide and hydrogen sulfide originally present.

At start-up, back pressure valve 20 is closed and the enriched hydrogen product gas from the top of separator 19 is passed through line 21, valve 26 and expansion valve 22, whereby the pressure of this stream is reduced from about 1400 p.s.i.g. to about 140 p.s.i.g. By expansion across valve 22 the temperature of this gaseous stream is dropped to about $-78°$ F. (below the triple point of carbon dioxide) without solid formation. As previously described, the enriched hydrogen product gas in line 14 is then introduced into cooler 13 as a refrigerant to cool the second fraction 10 of the feed gas by noncontact counterflow heat exchange. From cooler 13, the departing enriched hydrogen product stream at a temperature of about 35 to 50° F. is passed through line 23 into acumulator 24, leaving by way of line 25 for subsequent use in processes such as oil-shale retorting, and noncatalytic hydrogenation of petroleum products, or if desired for further purification.

Higher refrigeration efficiencies are possible if the compressed gas in line 21 instead of being expanded at constant enthalpy through valve 22, is expanded at constant entropy; that is, the gas is made to operate an expansion engine or move the rotor of a turbo-electric generator not shown.

After start-up, a decreased cooling load on cooler 13 may make it no longer necessary to supply refrigerant to cooler 13 at a temperature of $-78°$ F. Valve 26 is then closed and the enriched hydrogen product gas in line 21 is by-passed through back pressure valve 20 and introduced into cooler 13 at a temperature of about $-55$ to $-65°$ F. This scheme avoids the large pressure drop previously experienced across expansion valve 22. The enriched product gas then becomes available at outlet 25 at a temperature of about 35 to 50° F. and at a pressure substantially equal to the line pressure at the feedstream inlet, less minor pressure drops in the system. The enriched hydrogen product gas comprises in volume percent hydrogen—75 to 85, carbon dioxide 9 to 18, carbon monoxide—3 to 7, methane—1 to 3, hydrogen sulfide—.04 to .2, nitrogen—.1 to .2, and argon—.02 to .1.

The enriched liquid carbon dioxide gas is withdrawn from the bottom of separator 19 through line 27 at a temperature of about $-55$ to $-65°$ F. and is passed through expansion valve 28. By expansion across valve 28, the enriched carbon dioxide liquid is cooled to a temperature of about $-68°$ F. without solid formation while its pressure drops from about 1400 p.s.i.g. to about 80 p.s.i.g. Then as previously described, a series of three successive noncontact counterflow heat exchange steps take place in coolers 16, 11 and 2 between the enriched carbon dioxide product stream on its way out of the system and the descending feedstream. In cooler 16, the enriched liquid carbon dioxide product stream vaporizes and leaves through line 12 to enter cooler 11 at a temperature of about −50 to −65° F. In cooler 11, the enriched carbon dioxide product stream is warmed further before it leaves through line 60. With valves 61 and 80 closed, the enriched carbon dioxide stream enters precooler 2 by way of lines 81 and 3 at a temperature of about −6° F.

The temperature of the shifted synthesis gas feedstream in precooler 2 is kept above the freezing point of the condensed water, in order to keep the flow lines into separator 4 from icing up and becoming blocked. Temperature control in precooler 2 is achieved by means of by-pass lines 82 and 83 and valve 80.

A slip-stream of about 1–3 s.c.f.m. of the enriched $CO_2$ product stream from line 60 may be used to purge out the water adsorbed by the desiccant in dryers 7 and 8 during the reactivation cycle. Dryers 7 and 8 consist of duel adsorbers with an interconnecting valve manifold for manual switching on an 8-hour reversal for continuous operation. Each adsorber contains sufficient activated desiccant to deliver water dewpoints in the range of −90° F. for entering saturation temperature up to 100° F. Reactivation is accomplished by heating the spent adsorber for about 4 hours by means of a heating element embedded in the desiccant. During this time the purge gas sweeps away the released water. Cooling with continuous purging then follows for another four hours. Sufficient valves are provided in the interconnecting manifold to direct either the adsorption or reactivation flows to either adsorber and to bleed down and build up pressures. For example, dryer 7 may be reactivated by opening valves 61, 62, 63, and 64 and closing valves 65 and 66; and a stream of enriched carbon dioxide product gas may be introduced into dryer 7 by way of lines 67, 68, 69, and 70. The purge gas with entrained water then leaves dryer 7 through lines 71, 72, 73, and 74 and may if desired be added to recycle stream 33.

From precooler 2, the departing enriched carbon dioxide stream at a temperature of about 15° F. is conducted through line 29 into accumulator 30 where it is stored, leaving the system by way of line 31 and outlet 32 for subsequent use in processes such as feed gas for urea manufacture after further purification, or for sulfur recovery, or it may be burned to recover heat. The enriched carbon dioxide product gas is available at outlet 32 at a temperature of about 15° F. and at a pressure of about 80 p.s.i.g. It comprises in volume percent carbon dioxide—70 to 80, hydrogen—15 to 30, carbon monoxide—2 to 4, hydrogen sulfide—.2 to .9, methane—.5 to 1.9, nitrogen—0.2 to .10, and argon—.03 to .08.

To improve the "separation efficiency" of the system, which is defined as the moles of carbon dioxide in the enriched carbon dioxide product stream divided by the total moles of carbon dioxide present in the shifted synthesis gas feed stream times 100, the process of the invention provides for the recycle of a slip-stream of separated carbon dioxide to the feed inlet stream. A portion of the enriched carbon dioxide product gas from line 31 may be conducted through line 33 to recycle compressor 34 wherein the gas is recompressed to process pressure and then conducted through line 35 into inlet line 1 where it is mixed with the incoming shifted synthesis gas feedstream. The advantages of such a scheme will be discussed further later.

In the operation of the system, when a lower temperature is required in order to condense out more carbon dioxide in the feed gas, temperature transmitter 36 signals temperature controller 37 to open valve 28 to supply more liquid carbon dioxide to cooler 16 by way of line 17. As the liquid level drops in separator 19, level transmitter 38 signals level controller 39 to open flow control valve 40 to increase the recycle flow from line 33. The increase in recycle rate increases the amount of carbon dioxide in the feedstream and provides more carbon dioxide for cooling and condensation by coolers 2, 11, 16, and separator 19. When the liquid level is too high in separator 19, level transmitter 38 signals level controller 39 to close flow control valve 40. The rate of recycle flow decreases thereby decreasing the amount of recycle $CO_2$ added to the feedstream 1. By this specific scheme for back up control, the level in separator 19 is controlled by the amount of recycle flow and the temperature in separator 19.

By lowering the temperature in separator 19, an increased amount of carbon dioxide and hydrogen sulfide is condensed from the feedstream; whereas, the amount of hydrogen lost in the enriched carbon dioxide product stream is relatively constant. For example at a line pressure of 1400 to 1435 p.s.i.g. and a separator temperature of −60° F. the percent of $CO_2$ and $H_2S$ condensed from the feedstream are respectively $CO_2$—82, and $H_2S$—85; whereas at a separator temperature of −65° F. these quantities are $CO_2$—90 and $H_2S$—92.

The function of the recycle stream is to increase the amount of condensable carbon dioxide in the feed. More liquid carbon dioxide may be thereby condensed in separator 19, so as to permit lower separator temperatures. The recycle is more beneficial at line pressures below 1400 p.s.i.g. than at higher operating pressures because of the effect of pressure on the $CO_2$ dew point temperature. The dewpoint of $CO_2$ varies directly with its partial pressure and inversely with the separator temperature.

The volume of enriched carbon dioxide recycle stream 33 required to effect a desired carbon dioxide condensation may be determined by well known experimental procedures.

In another embodiment of the invention, refrigeration efficiencies may be improved by the adiabatic isentropic expansion of all or a portion of the enriched carbon dioxide product gas from line 32 to provide a refrigerant without forming solids having a temperature of about −110° F. and a pressure of about one atmosphere. This refrigerant may be used in noncontact counterflow heat exchange with the feedstream in coolers 2, 11, 13, or 16; or a portion may be used in the inter and after coolers of carbon dioxide compressor 34.

EXAMPLES OF PREFERRED EMBODIMENTS

The following examples are offered as a better understanding of the present invention, but the invention is not to be construed as unnecessarily limited thereto. Material flow, gas analyses, and operating conditions are summarized in Table I for Example I.

EXAMPLE I

About 372 lbs. per hour of a heavy fuel oil having an API gravity of 12.8, a gross heating value of 18,005 B.t.u. per pound, and an ultimate analysis comprising in weight percent C—84.08, $H_2$—10.60, and S—4.51 were reacted with approximately 372 lbs. per hour of 95 percent oxygen by volume in a compact, unpacked synthesis gas generator, such as the generator disclosed in U.S. Pat. 2,582,938 issued to DuBois Eastman and Leon P. Gaucher. The temperature and pressure in the reaction zone were 1986° F. and 1490 p.s.i., respectively.

About 848 lbs. per hour of raw synthesis product gas from the gas generator comprising substantially 48.58 mole percent of hydrogen and 40.23 mole percent of carbon monoxide were cooled to below a temperature of 600° F. by direct quenching in water. The cooled gases were then scrubbed with water, preheated to a temperature of about 750° F., and in a shift converter at a pressure of about 1455 p.s.i.g. reacted with steam over a suitable catalyst such as iron oxide.

About 396 lbs./hr. of water saturated shifted synthesis gas from shift converter and about 5 lbs. per hour of carbon dioxide recycle stream were introduced as the feedstream into line 1 of the previously described $CO_2$ condensation system, illustrated by the accompanying drawing. About 0.07874 lbs./hr. of water were condensed from the feedstream in precooler 2 and removed from the system in separator 4. An additional 0.01956 lbs./hr. of water vapor were removed from the feedstream in dryers 7 and 8. The dry gas analysis of the feed gas is shown in Table I.

The dried feed gas was split into fraction 9 (about 110 lbs. per hour) and fraction 10 (about 321 lbs. per hour). Fraction 9 was introduced into the tube side of cooler 11 and fraction 10 was introduced into the tube side of cooler 13. After cooling, these streams were recombined and introduced into the tube side of cooler 16, where about 81.5% of the carbon dioxide and hydrogen sulfide in the feedstream condensed out along with minor amounts of other gases. The analysis for this stream of condensed gases is shown in Table I and is designated "enriched carbon dioxide product stream." This stream was separated from the uncondensed gases in separator 19. The analysis for the uncondensed gases is shown in Table I and is designated "enriched hydrogen product stream." This stream comprises about 87% of the hydrogen in the feedstream.

About 243 lbs. per hour of enriched carbon dioxide product stream were freely expanded across valve 28 and the cooled product was serially introduced into the shell side of coolers 16, 11 and 2 as the refrigerant in noncontact counterflow heat exchange with said downflowing feedstream. Similarly, about 96 lbs. per hour of enriched hydrogen product stream were freely expanded across valve 22 and the cooled product was introduced into the shell side of cooler 13 as the refrigerant.

The temperatures and pressures of the different streams at various points in the system are shown in Table I.

TABLE I

| | S.C.F.H. | Lb./hr. | Moles/hr. |
|---|---|---|---|
| Material flow: | | | |
| Shifted synthesis gas at inlet (feed gas) | 8,187 | 306.6 | 21.6 |
| Enriched $CO_2$ product stream at 32 | 2,859.3 | 242.9 | 7.5 |
| Enriched $H_2$ product stream at 25 | 4,145.6 | 96.1 | 10.9 |
| Fraction 9 of feedstream | 2,276.2 | 110.3 | 6.0 |
| Fraction 10 of feedstream | 6,621.1 | 320.8 | 17.4 |

| | Feed gas | | Enriched $CO_2$ prod. str. | | Enriched $H_2$ prod. str. | |
|---|---|---|---|---|---|---|
| | Vol. percent | Lb.-mole/ hr. | Vol. percent | Lb.-mole/ hr. | Vol. percent | Lb.-mole/ hr. |
| Dry gas analysis: | | | | | | |
| $H_2$ | 57.07 | 10.5340 | 25.34 | 1.9091 | 78.93 | 8.6221 |
| $CO_2$ | 34.66 | 6.3974 | 68.82 | 5.1850 | 10.74 | 1.1732 |
| CO | 5.06 | 0.9339 | 3.62 | 0.2127 | 6.49 | 0.7089 |
| $CH_4$ | 2.91 | 0.5371 | 1.87 | 0.1408 | 3.56 | 0.3888 |
| $H_2S$ | 0.06 | 0.0110 | 0.25 | 0.0188 | 0.04 | 0.0043 |
| $N_2$ | 0.16 | 0.0295 | 0.04 | 0.0030 | 0.16 | 0.0174 |
| A | 0.08 | 0.0147 | 0.06 | 0.0045 | 0.08 | 0.0087 |
| Total | 100.00 | 18.4580 | 100.00 | 7.5342 | 100.00 | 10.9237 |
| Avg. mol. wt. | | 18.3857 | | 32.2328 | | 8.7972 |

Operating conditions:
Temperature, °F.:

| | Cooler | | | |
|---|---|---|---|---|
| | 2 | 11 | 13 | 16 |
| Shell: | | | | |
| In | −6 | −65 | −78 | −68 |
| Out | 53 | −6 | 38 | −65 |
| Tube: | | | | |
| In | 70 | 48 | 48 | −5 |
| Out | 48 | −16 | −4 | −65 |

Pressure, p.s.i.g.:
Feedstream at 1 _____ 1,420
Enriched $CO_2$ product stream at 32 _____ 80
Enriched $H_2$ product stream at 25 _____ [1] 140

[1] At start-up—1,400 during normal operation.

EXAMPLE II

In Example II 23.877 lb.-moles/hr. of a gaseous feed stream containing 7.961 lb.-moles/hr. of $CO_2$ enters the $CO_2$ condensation system illustrated by the accompanying drawing at a line pressure of 1425 p.s.i.a.

By the results of Example II, which are summarized in Table II, it may be demonstrated that the amount of carbon dioxide that is condensed from the feedstream may be increased from 62.2 to 80.3% by increasing the amount of enriched $CO_2$ product gas that is compressed and recycled to the feed inlet by way of lines 33 and 35.

Also as the volume of recycle gas increases, the separator temperature falls, the $CO_2$ separation efficiency increases, and the $CO_2$ content in the enriched hydrogen product stream falls off greatly while the hydrogen content in the enriched $CO_2$ product stream changes slightly.

With no recycle, 6.448 lb.-moles/hr. of enriched $CO_2$ product gas is produced containing 4.777 lb.-moles per hour of $CO_2$ at a separator temperature of −38° F. As previously described in the specification, it has been experimentally determined that to condense about 80% of the $CO_2$ in the feedstream, the temperature in separator 19 must reach about −60° F. The actual separator temperature and recycle rate required to give the desired separation efficiency for a constant initial separator temperature and feed gas rate may be determined experimentally or may be calculated by well known methods.

TABLE II

| Recycle, s.c.f.h., line 33 | Separator temp., °F. | $CO_2$ dewpoint temp. | Feed gas, percent | | | | Enriched $CO_2$ product, percent | | Enriched $H_2$ product, percent | | $CO_2$ separation efficiency, percent |
|---|---|---|---|---|---|---|---|---|---|---|---|
| | | | Before recycle | | With recycle | | | | | | |
| | | | $CO_2$ | $H_2$ | $CO_2$ | $H_2$ | $CO_2$ | $H_2$ | $CO_2$ | $H_2$ | |
| 0 | −38 | 25.6 | 33.30 | 62.33 | 33.30 | 62.33 | 74.09 | 22.03 | 16.69 | 78.49 | 62.2 |
| 89.6 | −42 | 26.3 | 33.30 | 62.33 | 33.69 | 61.93 | 72.97 | 21.97 | 17.20 | 78.70 | 63.2 |
| 169 | −46 | 27.1 | 33.30 | 62.33 | 34.02 | 61.59 | 75.61 | 22.27 | 15.58 | 79.10 | 67.0 |
| 241 | −50 | 27.8 | 33.30 | 62.33 | 34.46 | 61.29 | 78.11 | 22.56 | 13.92 | 79.53 | 70.8 |
| 308 | −54 | 28.5 | 33.30 | 62.30 | 34.85 | 61.03 | 80.48 | 22.84 | 12.23 | 79.97 | 74.6 |
| 370 | −53 | 29.3 | 33.30 | 62.33 | 35.24 | 60.79 | 82.73 | 23.09 | 10.51 | 80.42 | 78.4 |
| 400 | −60 | 29.7 | 33.30 | 62.33 | 35.43 | 60.68 | 83.80 | 23.21 | 9.64 | 80.65 | 80.3 |

We claim:
1. A continuous autorefrigeration process for separating a shifted synthesis gas feedstream into an enriched carbon dioxide product stream and a gaseous enriched hydrogen product stream comprising the steps of:
(1) cooling said shifted synthesis gas feedstream stepwise at superatmospheric pressure by noncontact counter flow heat exchange in a plurality of separate cooling zones, and where in each separate cooling zone one of two streams of coolant of different compositions which are produced subsequently in the process is passed in heat exchange relationship with one stream of synthesis gas feed thereby cooling said synthesis gas feedstream to a temperature below the dew point at the pressure of said synthesis gas feedstream, and wherein at least one of the separate cooling zones, the synthesis gas flows in split streams, each split stream of which is cooled by separate product streams of different compositions out of heat exchange with each other, and separating in a gas-liquid separation zone a liquefied enriched carbon dioxide product stream and a gaseous enriched hydrogen product stream;
(2) withdrawing at least a portion of said liquefied enriched carbon dioxide product stream from the separation zone in (1), expanding at substantially the temperature at which it is removed from separation zone and passing said expanded portion through at least one cooling zone in (1) as one of said streams of coolant at reduced pressure relative to said separation zone, and removing the enriched carbon dioxide product stream departing from (1) in gaseous phase at a temperature higher than that in said separation zone;
(3) simultaneously withdrawing at least a portion of said gaseous enriched hydrogen product stream from the separation zone of (1) and passing said portion as said other stream of coolant through at least one cooling zone in (1) which is separate and distinct from any cooling zone cooled in (2) by said first stream of coolant; and
(4) withdrawing the gaseous enriched hydrogen product stream from (3) at a temperature higher than the temperature in said separation zone.

2. The process of claim 1 wherein said shifted synthesis gas feedstream contains a minor amount of $H_2S$ which is substantially removed from said feedstream by condensing and mixing with the enriched carbon dioxide product gas stream departing from step (2).

3. The process of claim 1 with the added steps of recompressing a slipstream portion of the enriched carbon dioxide product gas stream departing from step (2) to equal the pressure of the synthesis gas feedstream to step (1), and admixing said compressed portion of the enriched carbon dioxide product gas stream with said incoming synthesis gas feedstream to step (1) in an amount sufficient so as to improve the separation efficiency of the process and to permit a higher acceptable thermal gain from the process system.

4. The process of claim 1 with the added step of reducing the pressure of said gaseous enriched hydrogen product gas stream prior to introducing at least a portion of it into said cooling zone by polytropic expansion so limited as to prevent the formation of solids, thereby cooling such gaseous enriched hydrogen product stream to a temperature in the range of about $-65$ to $-110°$ F.

5. The process of claim 4 wherein at least a portion of said gaseous enriched hydrogen product stream is cooled to said temperature in the range of about $-65$ to $-110°$ F. by expansion in an expansion engine.

6. The process of claim 4 wherein at least a portion of said gaseous enriched hydrogen product stream is cooled to said temperature in the range of about $-65$ to $-100°$ F. by expansion through a throttle valve.

7. The process of claim 1 with the step of cooling all or a portion of the enriched carbon dioxide product stream coolant departing from the cooling zone in step (2) to a temperature in the range of $-65$ to $-110°$ F. by essentially adiabatic isentropic expansion in a gas turbine so limited as to avoid the formation of solids.

8. The process of claim 1 wherein said shifted synthesis gas feedstream contains a minor amount of $H_2O$ which is at least partially removed from said feedstream by the additional step of cooling the incoming synthesis feedstream in a separate and distinct cooling zone prior to step (1) to a temperature below the dew point of $H_2O$ at the pressure of said process gas by non-contact indirect heat exchange with the enriched carbon dioxide product gas stream departing from step (2), thereby forming liquid water, and separating said water from the uncondensed process gases in a separating zone.

9. The process of claim 8 with the added step of dehydrating the uncondensed process gases in a desiccating zone.

10. An autorefrigeration process for separating a process gas stream substantially comprising hydrogen and carbon dioxide and containing a minor amount of $H_2O$ and $H_2S$ into a substantially dry enriched carbon dioxide product gas stream containing a substantial portion of said $H_2S$ and a substantially dry gaseous enriched hydrogen product stream which comprises the steps of
(1) introducing said process gas stream into a cooling zone and cooling said feedstream to a temperature below the dew point of the water vapor at the pressure of said process gas stream but above the dew point of the carbon dioxide in the feedstream by noncontact counter flow heat exchange with a departing enriched carbon dioxide product gas stream subsequently produced in the process to effect condensation of part of the water, separating the water from the uncondensed gases in a separating zone, and dehydrating the uncondensed gases in a desiccating zone;
(2) introducing separate portions of said dried process gas stream leaving (1) into a plurality of separate cooling zones and simultaneously cooling said portions to a temperature below the dew point of said process feed gas but above the triple point of carbon dioxide by non-contact counterflow heat exchange yielding a plurality of cooled effluent steams;
(3) combining said cooled effluent streams departing from (2) and cooling the combined streams further in a separate and distinct cooling zone to a temperature below the dew point of the process gas stream but above the triple point of carbon dioxide by noncontact counterflow heat exchange, thereby producing a mixture comprising a liquefied enriched carbon dioxide stream containing a substantial portion of the $H_2S$ originally present in said process gas stream and a gaseous enriched hydrogen product stream;
(4) separating said liquid phase enriched carbon dioxide stream from said gas phase enriched hydrogen product stream in a separating zone;
(5) withdrawing the liquefied enriched carbon dioxide stream from (4) and expanding same to a lower pressure and temperature without forming solids, and in countercurrent heat exchange with said process gas stream introducing said expanded enriched carbon dioxide stream serially into the cooling zone of (3) then into at least one cooling zone of (2), and then into the cooling zone of (1), and removing said enriched carbon dioxide stream at an increased temperature after said heat exchange as said enriched carbon dioxide product gas stream, and (6) introducing the gaseous enriched hydrogen product stream leaving (4) into at least one separate and distinct cooling zones of (2), said zones of (2) being completely out of heat exchange with each other, and removing said stream at a higher outlet temperature after heat exchange as said product gas fraction rich in hydrogen.

11. The process of claim 10 with the added steps of compressing a slip-stream of said enriched carbon dioxide product gas stream departing from step (5) to about the pressure of the incoming process gas stream feed in step (1), and introducing said compressed portion of the enriched carbon dioxide product gas stream into the cooling zone in step (1) in admixture with said incoming process gas feedstream and in an amount sufficient to increase the separation efficiency of the process and to permit higher acceptable thermal gain from the process system.

12. The process of claim 10 with the added requirement in step (6) of withdrawing and cooling said gaseous enriched hydrogen product stream from step (4) to a temperature in the range of about −65 to −110° F. by polytropic expansion so limited as to prevent the formation of solids before introducing said gaseous enriched hydrogen product stream into said separate and distinct cooling zone of step (2).

References Cited

UNITED STATES PATENTS

| | | | |
|---|---|---|---|
| 2,585,288 | 2/1952 | Van Nuys | 62—26 |
| 2,632,316 | 3/1953 | Du Bois | 62—11 |
| 3,218,816 | 11/1965 | Grenier | 62—26 |
| 3,257,813 | 6/1966 | Hashemi-Tafreshi | 62—26 |
| 3,290,890 | 12/1966 | Bray | 62—26 |
| 3,420,633 | 1/1969 | Lee | 62—26 |

NORMAN YUDKOFF, Primary Examiner

A. F. PURCELL, Assistant Examiner

U.S. Cl. X.R.

62—18, 23

UNITED STATES PATENT OFFICE
CERTIFICATE OF CORRECTION

Patent No. 3,614,872    Dated October 26, 1971

Inventor(s) Joseph P. Tassoney and Warren G. Schlinger

It is certified that error appears in the above-identified patent and that said Letters Patent are hereby corrected as shown below:

Column 12, line 11    After "Du Bois" please insert

-- Eastman --

Please add the following claims:

-- 13. The process of Claim 1, wherein the reduction in pressure of said liquefied enriched carbon dioxide product stream in (2) is effected by expansion through a throttle valve thereby cooling said carbon dioxide product stream to a temperature in the range of about minus 55 to above minus 69°F. --

-- 14. The process of Claim 1, wherein the enriched gaseous hydrogen product stream from (4) is withdrawn at a pressure not substantially lower than the pressure of the feedstream to (1). --

Column 5, line 52    "nitrogen-0.2 to .10" should
                     read  -- nitrogen-0.02 to .10 --

Signed and sealed this 30th day of January 1973.

(SEAL)
Attest:

EDWARD M. FLETCHER, JR.          ROBERT GOTTSCHALK
Attesting Officer                Commissioner of Patents